June 8, 1954   N. HALL   2,680,374
REED TESTING DEVICE FOR MUSICAL INSTRUMENTS
Filed Jan. 18, 1952

Inventor
Nelson Hall
Barthel & Bugbee
Attorneys

Patented June 8, 1954

2,680,374

UNITED STATES PATENT OFFICE 2,680,374

REED TESTING DEVICE FOR MUSICAL INSTRUMENTS

Nelson Hall, Detroit, Mich.

Application January 18, 1952, Serial No. 267,123

5 Claims. (Cl. 73—100)

This invention relates to reed instruments, and in particular, to reed testing and selecting devices for such instruments.

One object of this invention is to provide a reed testing device for musical instruments of the so-called "beating" type, such as clarinets and saxophones, so as to enable the rapid and accurate selection of reeds of certain definite characteristics which are especially adapted to operate satisfactorily with a particular mouthpiece and in accordance with the preferences of the player.

Another object is to provide a reed testing device of the foregoing character, wherein the resilient characteristics of the reed are indicated on a graduated scale so that all reeds having the same characteristics for a particular mouthpiece will give substantially the same reading on the scale and can therefore be quickly and easily selected and segregated from a large number of reeds of varied characteristics.

Another object is to provide a reed testing device of the foregoing character, wherein the reed is mounted on a fulcrum at the same distance from its tip as its fulcrum in the mouthpiece of the instrument while the reed is at rest, so that its resilience while mounted in this position simulates the resilience which it possesses in the instrument, this resilience being indicated by a pointer registering with a graduated scale indicating different degrees of resilience.

Another object is to provide a reed testing device which tests the resilient characteristics or stiffness of the playing or vibrating part of the reed in the closing or playing position.

Other objects and advantages of the invention will become apparent during the course of the following description of the accompanying drawing, wherein.

Figure 5:
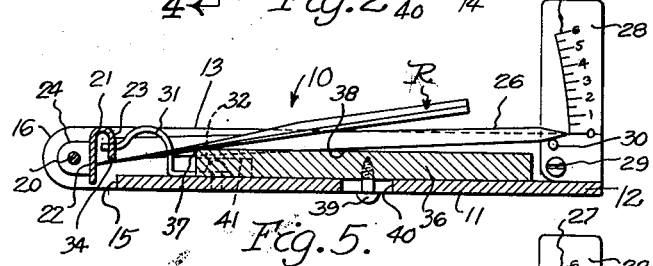
Figure 5 is a central vertical longitudinal section through the reed testing device shown in Figure 1, with a reed inserted but not yet depressed.
Figure 6:
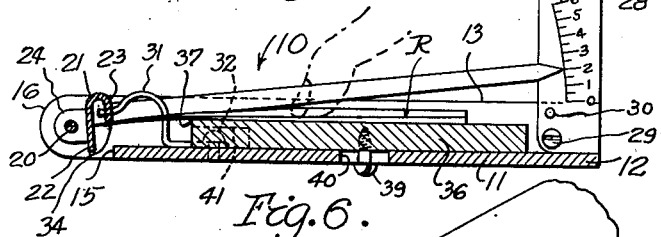
Figure 7:
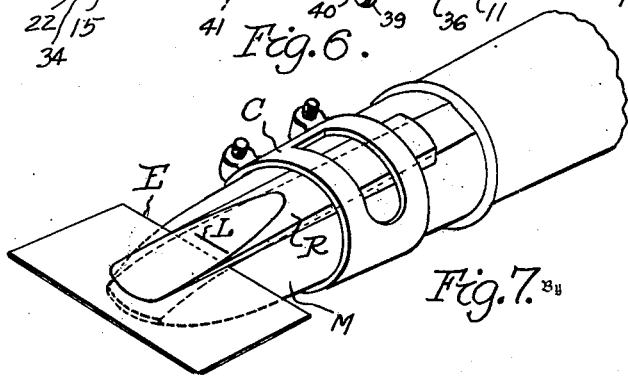

Figure 6 is a view similar to Figure 5, but with the reed depressed by the finger of the operator and its resilience or stiffness indicated by the pointer on the graduated scale; and Figure 7 is a perspective view of a mouthpiece of a reed instrument with the reed clamped in its playing position, showing the use of a piece of paper to indicate the fulcrum point at which the vibrating part of the reed touches the mouthpiece when the reed is at rest.

Figure 1:
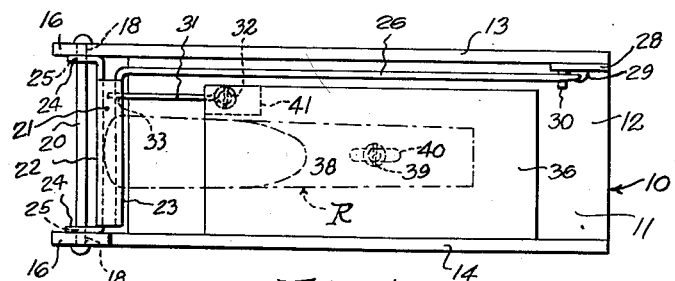
Figure 1 is a top plan view of a reed testing device, according to one form of the invention, with the position of the reed under test indicated by dotted lines.
Figure 2:
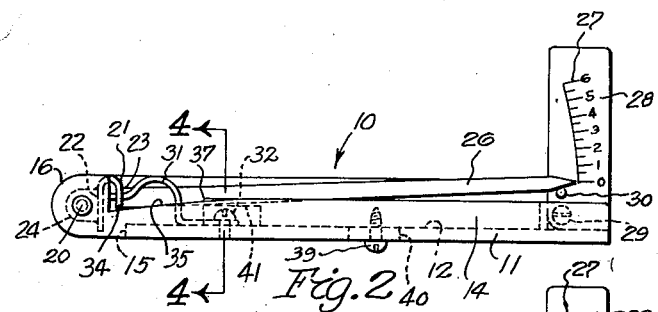
Figure 2 is a side elevation of the reed selecting and testing device shown in Figure 1, with the reed removed.
Figure 3:
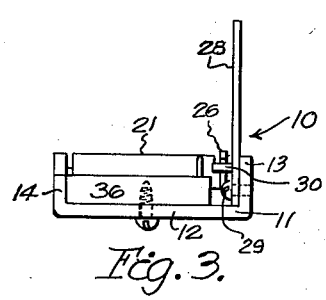
Figure 3 is a right-hand end elevation of the reed testing instrument shown in Figures 1 and 2.

Referring to the drawing in detail, Figure 1 shows a reed selecting device, generally designated 10, according to one form of the invention, as consisting of a channel-shaped base 11 having a bottom portion 12 and side flanges 13 and 14, the side flanges 13 and 14 being extended beyond the left-hand or inner end 15 of the bottom portion 12 in order to provide ears 16 which are bored as at 18 to receive a rivet-like pivot pin 20 upon which a contact member 21 is pivotally mounted. The contact member 21 is elongated and of U-shaped cross-section (Figures 5 and 6) with parallel forward and rearward portions 22 and 23 respectively of different widths. The forward portion 22 at its opposite ends is provided with perpendicularly bent ears 24 which are bored as at 25 to receive the pivot pin 20, whereas the rearward portion 23 at one end is provided with a perpendicularly bent pointer or needle 26.

The pointer 26 extends parallel to the right-hand side flange 13 and registers with a graduated scale 27 on a plate 28 which is secured as at 29 to the same flange 13 and rises vertically from the base 11. The plate 28 is provided with a stop pin 30 for halting the pointer 26 at the zero point of the scale 27. One end of a humped wire spring 31 is secured as at 32 to the bottom portion 12 of the base 11 and its free end engages an aperture 33 (Figure 1) in the rearward portion 23 of the contact member 21 so as to urge the pointer 26 downward against the zero stop 30. The lower edge 34 of the rearward portion 23 of the contact member 21 serves as a contact edge for engaging the reed R being tested (Figure 5).

Figure 4:
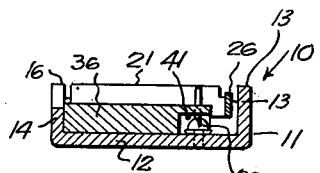
Figure 4 is a vertical cross-section taken along the line 4—4 in Figure 2.

The side flange 14 is lower than the opposite side flange 13 and its forward upper edge is cut away as at 35 to simulate the curvature of the mouthpiece M where it is engaged by the vibrative part of the reed R. Slidably mounted in the channel-shaped base 11 between the flanges 13 and 14 is a fulcrum block 36, the forward edge 37 of which serves as a fulcrum for the reed R being tested. The upper surface 38 of the block serves as an abutment surface for the latter (Figure 6) when the reed is pressed down against it by the finger of the operator. The block 36 is limited in its motion as well as retained in position by a stop screw 39 passing through an elongated slot 40 into the block 36 from beneath the base 11. The block 36 at its forward end is cut away as at 41 (Figure 4) to provide clearance for the anchoring screw 32 for the spring 31.

In the operation of the device, the player or operator first clamps a reed R in the mouthpiece M of the instrument (Figure 7) by means of the usual clamp C. He then inserts a sheet of thin paper P in the space between the reed R and the mouthpiece M and pushes it inward until it reaches the point at which the reed R contacts the mouthpiece M, which is the fulcrum point of the reed R while it is at rest in the mouthpiece M. To indicate this point on the reed R, the operator then draws a pencil line or makes a scratch L immediately above the edge E of the paper sheet P which indicates the fulcrum point of the reed R upon the mouthpiece M.

The operator or player then places the marked reed R in the reed tester 10, with its forward end against the forward portion 22 of the contact member 21 and with the contact edge 34 thereof resting upon the reed R (Figure 5). The operator then slides the block 36 to and fro until its fulcrum edge 37 coincides with and lies immediately beneath the line L on the reed R, and locks it in position by tightening the stop screw 39. This adjustment will then suffice for selecting all subsequent reeds for that particular mouthpiece, without the necessity of marking any more reeds.

Having thus adjusted the device, the user then places his finger upon the reed R and presses it firmly downward against the upper or abutment surface 38 of the block 36. The resilience or spring effect of the reed R counteracts the downward thrust of the spring 31 to some extent and causes the pointer or needle 26 to swing upward (Figure 6), the resilience or stiffness of the reed being indicated by the graduated scale 27 on the plate 28. At the same time, by comparing the actual curvature of the bent reed with the desired curvature as indicated by the curvature of the edge portion 35, the player or operator can judge in advance the suitability of the reed R for his particular mouthpiece. If the reed arches above the curved edge 35 and leaves a gap therebetween, the player knows that the reed will also leave a similar gap when it is inserted in the actual mouthpiece and thus will not completely close the mouthpiece so as to produce the bell-like tone so much desired by players of such reed instruments.

What I claim is:

1. A reed testing device for musical instruments comprising a base structure, a reed support slidably mounted on said structure to slide along the direction of the axis of the reed and having a reed fulcrum thereon, a reed-contacting element pivotally mounted on said structure and having an indicator connected thereto, said reed-contacting element having a reed-engaging portion spaced away from the pivot thereof and from said fulcrum, a graduated scale mounted on said structure in registry with said indicator, and a resilient member engaging and urging said reed-contacting element in a direction opposing the direction of motion thereof in response to the resilience of the reed under test.

2. A reed testing device for musical instruments comprising a base structure, a reed support slidably mounted on said structure to slide along the direction of the axis of the reed and having a feed fulcrum thereon, a reed-contacting lever pivotally mounted on said structure and having a pointer connected thereto, said reed-contacting lever having a reed-engaging portion spaced away from the pivot thereof and from said fulcrum, a graduated scale mounted on said structure in registry with said pointer, and a resilient member engaging and urging said reed-contacting lever in a direction opposing the direction of motion thereof in response to the resilience of the reed under test.

3. A reed testing device for musical instruments comprising a base structure, a reed support slidably mounted on said structure to slide along the direction of the axis of the reed and having a reed fulcrum thereon, a reed-contacting lever pivotally mounted on said structure and having a pointer connected thereto, said reed-contacting lever having a reed-engaging portion spaced away from the pivot thereof and from said fulcrum, a graduated scale mounted on said structure in registry with said pointer, and a resilient member engaging and urging said reed-contacting lever in a direction opposing the direction of motion thereof in response to the resilience of the reed under test.

4. A reed testing device for musical instruments comprising a base structure, a reed support slidably mounted on said structure to slide along the direction of the axis of the reed and having a reed fulcrum thereon, a reed-contacting lever pivotally mounted on said structure and having a pointer connected thereto, said reed-contacting lever having a reed-engaging portion spaced away from the pivot thereof and disposed between said pivot and said fulcrum, a graduated scale mounted on said structure in registry with said pointer, and a resilient member engaging and urging said reed-contacting lever in a direction opposing the direction of motion thereof in response to the resilience of the reed under test.

5. A reed testing device for musical instruments comprising a base structure, a reed support slidably mounted on said structure to slide along the direction of the axis of the reed and having a reed fulcrum thereon, a reed-contacting lever pivotally mounted on said structure and having a pointer connected thereto, said reed-contacting lever having a reed-engaging portion spaced away from the pivot thereof and disposed between said pivot and said fulcrum, a graduated scale mounted on said structure in registry with said pointer, and a resilient member engaging and urging said reed-contacting lever in a direction opposing the direction of motion thereof in response to the resilience of the reed under test.

References Cited in the file of this patent

UNITED STATES PATENTS

| Number | Name | Date |
| --- | --- | --- |
| 62,775 | Plympton | Mar. 12, 1867 |
| 1,915,239 | Broadus | June 27, 1933 |
| 2,577,805 | Pidduck | Dec. 11, 1951 |

FOREIGN PATENTS

| Number | Country | Date |
| --- | --- | --- |
| 636,466 | France | Jan. 12, 1928 |